United States Patent
Grabelsky et al.

(10) Patent No.: US 7,564,835 B1
(45) Date of Patent: Jul. 21, 2009

(54) SYSTEM AND METHOD FOR MAXIMIZING THE USE OF BANDWIDTH OPTIMIZATION TECHNIQUES IN VOICE-OVER-PACKET CONNECTIONS

(75) Inventors: David Grabelsky, Skokie, IL (US); Anoop Tripathi, Mt. Prospect, IL (US); Boris Bekkerman, Buffalo Grove, IL (US); Michael Homeier, Elmhurst, IL (US)

(73) Assignee: 3Com Corporation, Marlborough, MA (US)

( * ) Notice: Subject to any disclaimer, the term of this patent is extended or adjusted under 35 U.S.C. 154(b) by 1554 days.

(21) Appl. No.: 10/289,948

(22) Filed: Nov. 6, 2002

(51) Int. Cl.
*H04L 12/66* (2006.01)

(52) U.S. Cl. .................. 370/352; 370/356; 709/219

(58) Field of Classification Search ......... 370/352–356; 709/202, 219, 223
See application file for complete search history.

(56) References Cited

U.S. PATENT DOCUMENTS 6,968,367 B1 * 11/2005 Vassar et al. ................ 709/219
7,139,263 B2 * 11/2006 Miller et al. ................ 370/352

* cited by examiner

*Primary Examiner*—Suhan Ni
(74) *Attorney, Agent, or Firm*—McDonnell Boehnen Hulbert & Berghoff LLP

(57) ABSTRACT

A system and method for maximizing the use of bandwidth optimization techniques in a voice-over-packet telephony system. In exemplary embodiments, the VOP system includes a plurality of telephones connected to a VOP telephony system. Upon receiving request to initiate a VOP connection, the end office switch connects to an originating softswitch for signaling functions and to an originating media gateway for transporting the media associated with the VOP connection. A connection information system accessible to the softswitch maintains connection information relating to media sessions between the originating media gateway and a plurality of candidate terminating media gateways. The connection information system may be accessed during connection initiation and advantageously used to determine whether there are nearly-simultaneously occurring and distinct media sessions having common endpoints such that bandwidth optimization techniques may be implemented.

31 Claims, 8 Drawing Sheets

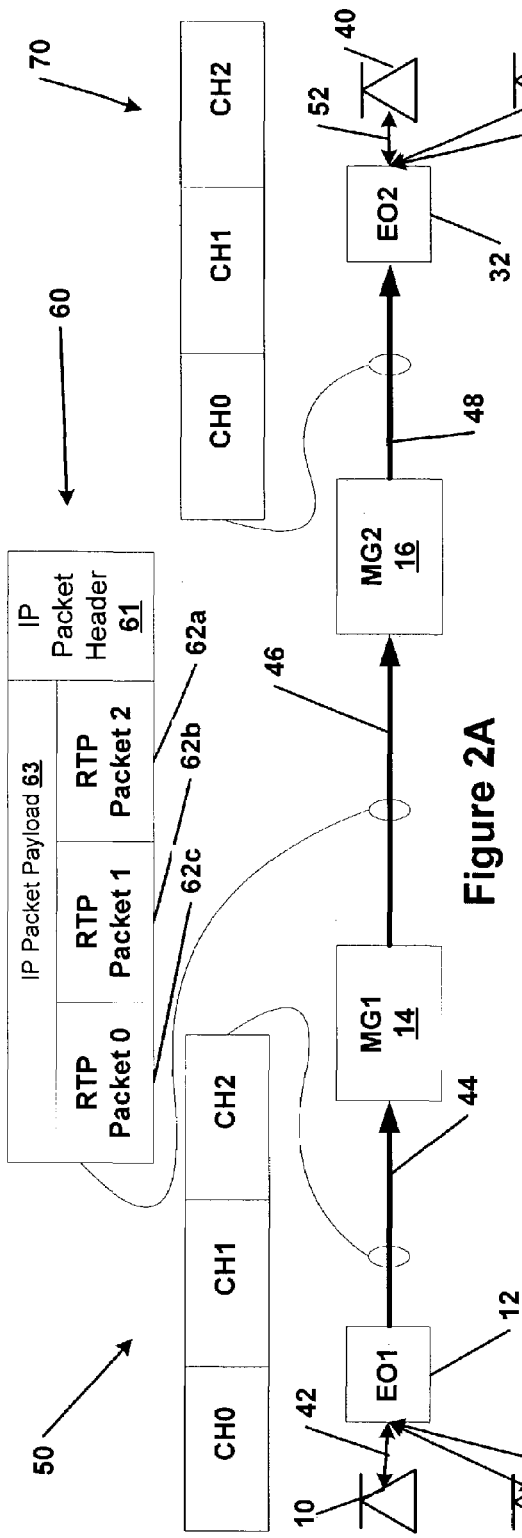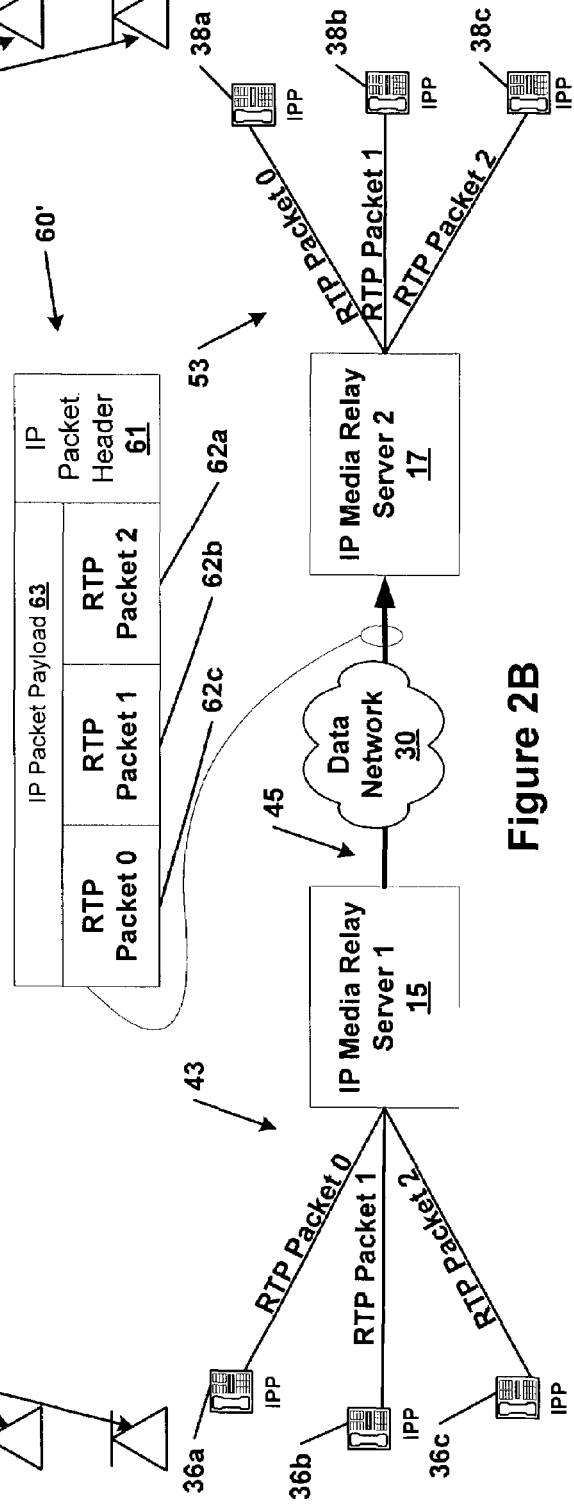
Figure 2A
Figure 2B

SYSTEM AND METHOD FOR MAXIMIZING THE USE OF BANDWIDTH OPTIMIZATION TECHNIQUES IN VOICE-OVER-PACKET CONNECTIONS

BACKGROUND OF THE INVENTION

A. Field of the Invention

The present invention relates to the field of data communications, and more particularly to techniques for communicating media streams in voice-over-packet telecommunications.

B. Description of the Related Art

Data networks, such as the Internet, have grown in their reach and capability to the point where they provide a practical alternative infrastructure for performing many communications functions that are presently performed over the general switched telephone network (GSTN). Indeed, even voice communication, the communication function that led to the development of the GSTN, may be performed on data networks. A growing number of telephony services offer basic voice telephony using data networks. These services are typically known as "voice-over-packet" services because they involve using a packet-switched data network for at least a portion of a telephone call connection. One example of a voice-over-packet service is "voice-over-IP" ("IP" refers to "Internet Protocol", a network protocol used for transporting data over the Internet).

Voice over IP (VoIP) uses one or more IP networks to set up phone calls and transport the voice data (media) in IP packets. The architectures and protocols of VoIP separate the media component and the call control component. The media component may use a media stream protocol, such as the Real-Time Protocol ("RTP"), to transport packetized voice data across the IP network between two media transport endpoints. The media component may also include interworking functions for translating between RTP-based media and other types of media transport (e.g., time-division multiplexed ["TDM"], asynchronous transfer mode ["ATM"], etc.). The call control component incorporates protocols, such as the Session Initiation Protocol ("SIP") and Megaco, to set up, tear down, and manage calls in the IP network, and includes interworking functions for translation between IP-based control protocols and PSTN control protocols (e.g., SS7 and PRI).

The data packets communicated in VoP, and particularly in VoIP, systems typically include a header and a payload. The header typically contains control information, or information used by the system to route or otherwise process the packets. For example, the header typically contains the IP addresses of the sources and destinations of the packets. The payload typically contains the data being communicated in the packet. In general, the header portion is overhead and should be as small in size as possible. One measure of efficiency that may be used to evaluate particular systems is the payload-to-header size ratio of the packets being communicated. The higher the ratio, the more efficient the system.

The RTP endpoints of a VoIP call may be IP media devices (e.g., IP phones), Media Gateways for interworking between an IP network and a TDM network or another packet network (ATM, Frame, etc.), or any combination thereof. The connection established between a pair of RTP endpoints defines an RTP session (or more generally, a media session), and each unidirectional media flow in the session defines an RTP stream (or more generally, a media stream). That is, a simple, point-to-point voice call utilizes one RTP session, and two RTP streams (one in each direction). The complete, end-to-end call path of the media may traverse an IP network exclusively, or a combination of IP network and some other type of network (TDM, ATM, etc.).

Within the IP network, a device known as a softswitch is typically responsible for performing call control functions. A softswitch is a network device that implements peer-to-peer call control protocols, protocol interworking, device control of Media Gateways, and application interfaces for service creation and maintenance. Basic services performed on these interfaces include directory mapping, billing and records, and authentication.

As the reach of VoIP deployments and the use of VoIP service grow, the volume of VoIP traffic on IP networks will also grow. The efficiency of the media transport will become increasingly important to network bandwidth utilization, packet processing, and their impact on quality. Factors that effect efficiency include data compression, the ability to detect silence intervals during a voice call and exclude them from RTP transport, and the size ratio of payload-to-header in the IP packets. The ability to exclude silence intervals from transport will always increase overall efficiency. However, depending upon how voice samples are packetized, the other two factors may have competing effects on efficiency. Considering a fixed IP header size and fixed RTP header size, then the gain from data compression is offset by some factor by the decrease in RTP payload size. Similarly, a decrease in sampling time, desirable for reducing delay, results in a smaller frame size, and again a low payload-to-header ratio.

Increasing the payload-to-header ratio can be achieved by some combination of larger payload size and smaller header size. There are a number of header compression algorithms available for decreasing the header size. However, for a single RTP payload, increasing the frame size implies less (or no) media compression, and/or longer packetization times. For a device that terminates many RTP streams, such as a Media Gateway, a better approach to increasing the payload size is to multiplex the RTP packets from multiple RTP streams in a single IP packet. In addition, further gains in both network bandwidth utilization and IP packet traffic reduction may be realized by combining both header compression and RTP multiplexing. However, multiple RTP streams can only share a single IP packet if they already share the same source and destination IP addresses. In general, there is no guarantee that multiple RTP streams from the same source IP address are ever destined to the same destination IP address. Accordingly, RTP multiplexing and header compression may not be used enough to realize the gains they promise.

It would be desirable to improve bandwidth optimization on VoIP networks by more frequently and more consistently implementing header compression and RTP (or stream) multiplexing techniques.

BRIEF DESCRIPTION OF THE DRAWINGS

Presently preferred embodiments of the invention are described below in conjunction with the appended drawing figures, wherein like reference numerals refer to like elements in the various figures, and wherein:

FIGS. 2A-2B are a block diagrams schematically showing stream multiplexing in the system shown in FIG. 1;

DETAILED DESCRIPTION OF THE PREFERRED EMBODIMENT

A. Overview

Figure 1:
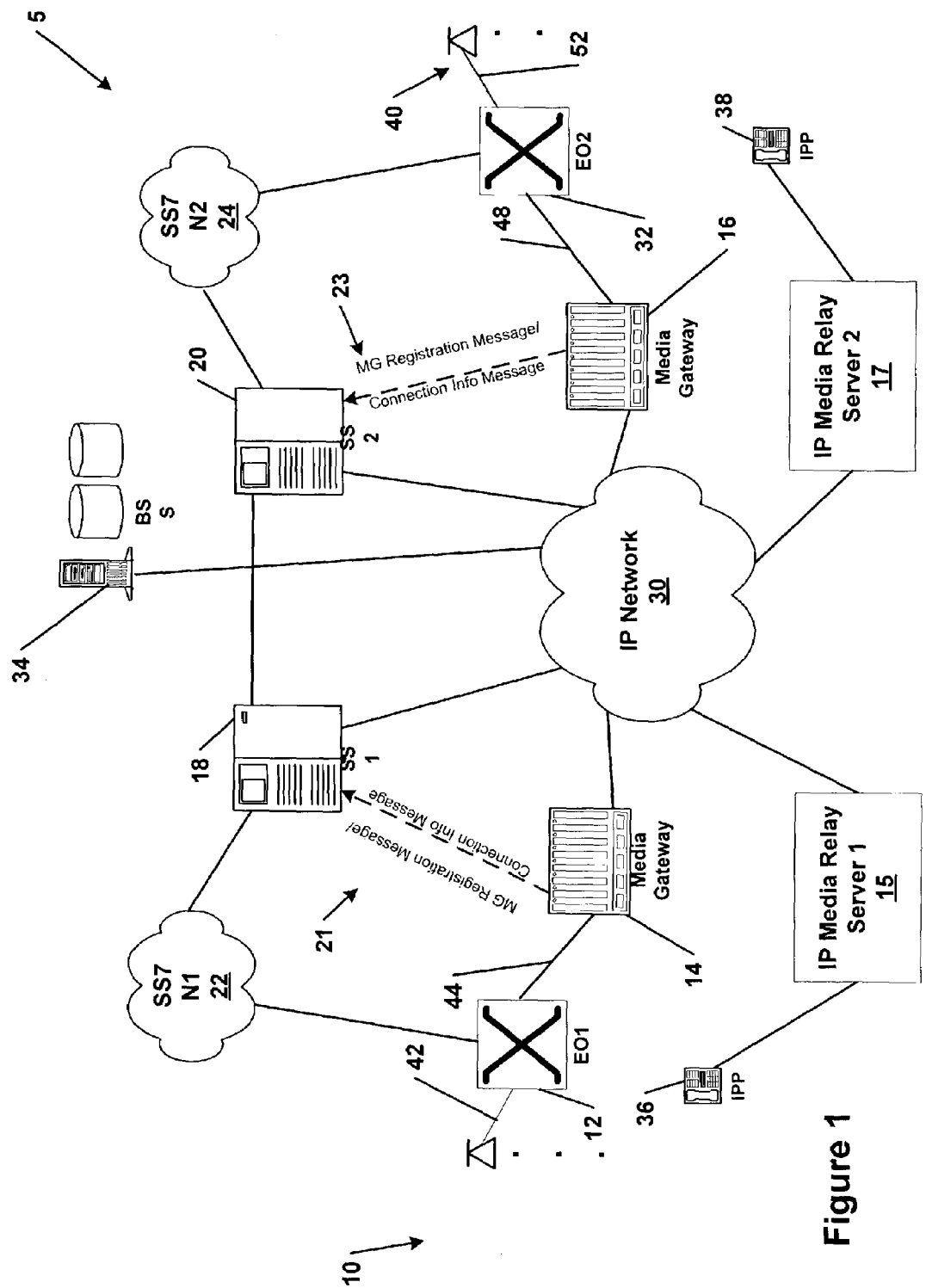
FIG. 1 is a block diagram of a telecommunications system implementing a Voice-Over-Packet telephony system of the type in which exemplary embodiments of the present invention find advantageous use.

FIG. 1 is a block diagram of a telecommunications system 5 that implements a Voice-Over-Packet telephony system of the type in which exemplary embodiments of the present invention find advantageous use. The telecommunications system 5 in FIG. 1 comprises a plurality of first plain-old-telephone system (POTS) telephones 10 connected to a first end office switch 12; and a plurality of second POTS telephones 40 connected to a second end office switch 32. The first and second end office switches 12, 32 are connected to a first and second signaling network nodes 22, 24, which may be parts of a signaling system used to control calls made on the public switched telephone network (PSTN). For example, the first and second signaling network nodes 22, 24 are preferably part of the Signaling System 7 (SS7) network. The system 5 in FIG. 1 implements systems and methods that advantageously effect the implementation of bandwidth optimization techniques for telephone calls made using Voice-Over-Packet telephony.

The system 5 shown in FIG. 1 may be used to implement various forms of Voice-Over-Packet (VOP) telephony. In one example of VOP telephony, only a portion of a telephone connection is carried over a packet switched data network 30. An initial portion of the connection may be communicated on a subscriber line 42 to the end office switch 12. The end office switch 12 communicates a data portion of the connection over the data network 30 to another end office switch 32. The other end office switch 32 is connected to the other party to the telephone connection by a second subscriber line 52. In another example of VOP telephony, a plurality of packet-based telephones, such as a first and second packet-based telephones 36, 38, may communicate directly on the data network 30. Both systems will be described in more detail below with reference to FIG. 1.

One of ordinary skill in the art will appreciate that the system 5 implements VOP telephony, in general, and is not to be limited in scope to any particular type of VOP system. That is, voice signals are communicated over the data network 30 in FIG. 1 as data packets that may conform to a media stream protocol as well as to a communications protocol. The media stream protocol may be any suitable protocol that defines a media packet structure. The inter-networking protocol may be any suitable protocol that defines an inter-network communications packet structure and schemes for ensuring that packets are routed to their intended destinations. In the description that follows, bandwidth optimization techniques are advantageously used to communicate the data packets by combining media packets in the data portions of transport packets and by compressing the header portion of the packets.

One of ordinary skill in the art will appreciate that embodiments of the system 5 are not limited to the implementation of any specific bandwidth optimization technique nor of any protocol (e.g. media stream protocol or inter-networking protocol). Exemplary embodiments advantageously provide for the implementation of any bandwidth optimization technique that may combine media packets from multiple media streams onto transport packets. These bandwidth optimization techniques may be implemented using media combination functions in which media streams are combined into sessions between common endpoints. The media combination functions may implement combination techniques such as multiplexing and/or compression techniques to advantageously effect bandwidth optimization. Examples of such media combination functions are described below with reference to FIGS. 2A-2C. One of ordinary skill in the art will appreciate that these are only examples and that others may be used as well.

In the description that follows, the system 5 shall be referred to as being a VoIP telephone system and it shall be assumed (for purposes of this description) that the packets communicated on the data network 30 conform to the Internet Protocol ("IP") protocol.

The first and second end offices 12, 32 in FIG. 1 communicate with a first media gateway 14 and a second media gateway 16, respectively. The media gateways 14, 16 transport the media component of the telephone connection over the data network 30. FIG. 1 also shows a first and second IP media relay server 15, 17, which provide media connections in VoIP telephony systems using IP telephones 36, 38.

Media gateways 14, 16 and IP media relay servers 15, 17 are preferred embodiments of media transporters. A media transporter is a network device which maps a plurality of input media streams to a plurality of output media streams, where the output media streams are transported on a packet network. The mapping is based upon some identifiers in each of the input and output streams. If the input and output streams are of different transport types, then the media transporter also provides a transcoding function between the two types. If the input and output streams are of the same transport type, then no transcoding is required. In one preferred embodiment, the input type is TDM and the output type is RTP. In this case, the input mapping identifier is a DS0 channel, the output identifier is an RTP port, and the media transporter transcodes between these two types. Media gateways 14, 16 are examples of this type of media transporter. In another preferred embodiment, the input and output types are both RTP. In this case, the input and output identifiers are both RTP ports, and no transcoding is required. IP media relay servers 15, 17 are examples of this second type of media transporter. Other examples of media transporters besides the media gateways 14, 16 and the first and second IP media relay servers 15, 17 may be used as well.

Because the media transporter outputs a plurality of media streams on a packet network, any pair of media transporters may connect many different streams between them. In such a configuration, it may be possible to achieve a multiplexing gain by taking advantage of common information used in the multiple media streams. For example, multiple RTP streams between the same two media transporters will all share the same source and destination IP addresses. This makes it possible to multiplex the streams in common IP packets. For purposes of illustration, exemplary embodiments are described as incorporating a media gateway as a preferred media transporter. It is to be understood, however, that this is one example of a media transporter and that any type of media transporter, which can be configured such that multiplexing of media streams between them can be accomplished can be used.

Of course, media transporters may serve a variety of functions relative to their role in a VoIP telephone system. With respect to the VoIP telephone system shown in FIG. 1, the media gateways 14, 16 provide inter-working of media between the IP network and the PSTN. The media gateways 14, 16 provide transcoding of the media stream between the two types of networks. In the system 5 shown in FIG. 1, the first media gateway 14 receives data over a time-division multiplexed (TDM) bus 44 that connects the media gateway 14 to the first end office switch 12. The media gateway 14 retrieves data from each channel on the TDM bus and converts the data to a format that allows for transmission over the data network 30. Preferably, the media gateway 14 packetizes the data from each channel in accordance with a suitable communications protocol and sends the packetized data over the data network 30 to a receiving media gateway 16. The receiving media gateway 16 de-packetizes the data and communicates the data on a TDM channel to which an endpoint telephone 40 is connected.

The first and second end offices 12, 32 in FIG. 1 communicate with a first softswitch 18 and second softswitch 20, respectively. The softswitches 18, 20 in the system 5 in FIG. 1 provide call control functions for VoIP telephone connections. For example, the softswitch 18 may receive a call request from the signaling system network node 22. The softswitch 18 may then locate a peer softswitch, such as softswitch 20 to establish a call control component of the VoIP telephone connection. The softswitches 18, 20 exchange call setup messages and other messages associated with call management on the call control component. The first softswitch 18 may then instruct the first media gateway 14 to initiate a media session with the second media gateway 16 to carry the media component of the VoIP telephone connection. The softswitches 18, 20 may also provide functions for controlling the Media Gateways 14, 16; interworking of signaling and call control between the data network 30 and the PSTN; and application interfaces (APIs) for service creation in the data network 30. In exemplary embodiments, a first message exchange 21 between the first softswitch 18 and the first media gateway 14 and a second message exchange 23 between the second softswitch 20 and the second media gateway 16 permit connection information and information regarding bandwidth optimization techniques to be communicated with the softswitches 18, 20. Exemplary message exchanges 21, 23 are described further in conjunction with the description of exemplary bandwidth optimization techniques in the section that follows.

For purposes of this specification, the first media gateway 12 will be referred to as the originating media gateway 12 and the second media gateway 32 will be referred to as the terminating media gateway 32. Communications of packets will also be described as proceeding from the originating media gateway 12 to the terminating media gateway 32. Similarly, the softswitches 18, 20 and the endpoint telephones 10, 40 shall be referred to as being originating and terminating devices for a VoP communication. One of ordinary skill in the art will appreciate however that this is purely for purposes of describing operation of exemplary embodiments with reference to FIG. 1 et seq within the context of telephone connections between the originating telephone 10 and the terminating telephone 40.

The system 5 also includes a backend server system 34 to maintain and provide information regarding subscribers (or users of telephony services), devices and pending connections. The backend server system 34 preferably provides services to the network through APIs to the softswitches 18, 20. Basic services may include directory mapping of phone numbers to IP addresses, billing and records, and authentication. In exemplary embodiments, the backend server system 34 maintains connection information relating to the end office switches 12, 32, media gateways 14, 16 and softswitches 18, 20.

The backend server system 34 may receive requests for connection information that will allow a softswitch to locate a terminating softswitch that best enables a telephone connection to use bandwidth optimization techniques. It should be noted that some configurations of softswitches 18, 20 may include the backend server as a component. The functionality of the backend server 34 is not limited by choice of configuration.

B. Bandwidth Optimization Techniques

1. Exemplary Techniques

Various bandwidth optimization techniques are available for conserving bandwidth in VoP telephony systems. In exemplary embodiments, the bandwidth optimization techniques are performed using media combination functions that are typically incorporated in media transporters. Examples of such media combination functions include stream multiplexing and header compression. These media combination functions, however, operate optimally under special conditions in the VoP telephony system that may not exist with sufficient frequency to substantially improve bandwidth efficiency. Exemplary embodiments of the present invention advantageously induce conditions under which the use of such media combination functions may be maximized.

In the discussion that follows with reference to FIGS. 2-9, the system 5 is a VoIP telephony system that uses the Real-Time Protocol (RTP) as a media stream protocol and the Internet Protocol (IP) as the inter-networking protocol. One of ordinary skill in the art will appreciate that these protocols are used as examples and that other protocols may be used.

Figure 2C:
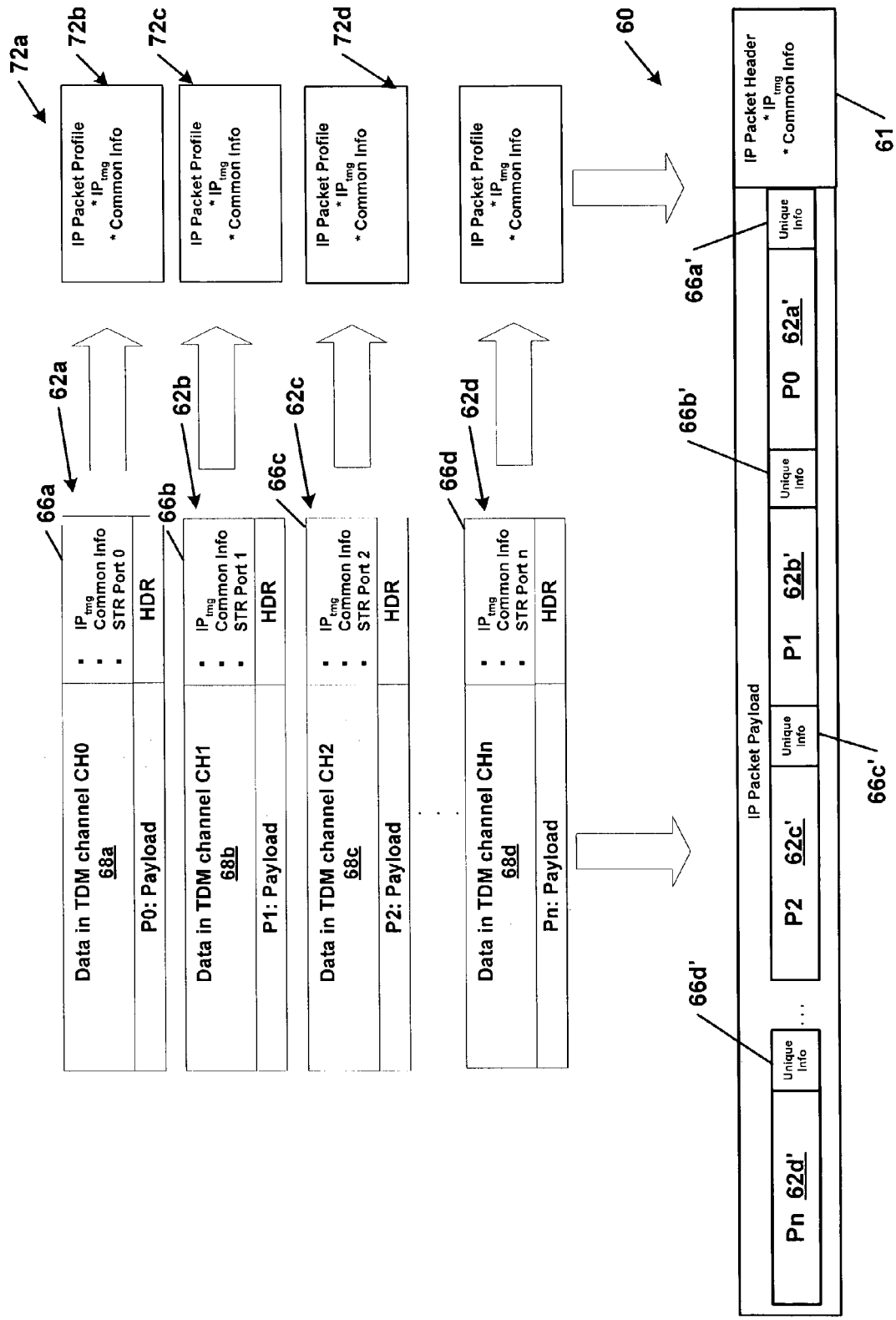
FIG. 2C is a block diagram schematically showing header compression in the system shown in FIG. 1.

FIGS. 2A-2C depict operation of two examples of media combination functions: RTP multiplexing and header compression. FIG. 2A illustrates operation of RTP multiplexing in VoIP telephony systems in which telephones connect over the data network 30 via the PSTN. FIG. 2B illustrates operation of RTP multiplexing in IP telephony systems in which telephones connect directly to the data network 30. One of ordinary skill in the art will appreciate that FIGS. 2A-2C illustrate examples of embodiments of the present invention. Other examples may be used as well.

In the system 5 in FIG. 2A, voice signals are communicated from the originating telephone 10 to the originating end office switch 12 on the subscriber line 42. At the originating end office switch 12, the voice signals are either received as, or converted to, a series of digital symbols that correspond to the analog voice signal waveform. These digital symbols are 8-bit values generated from an analog-to-digital conversion of the analog voice signals. The originating end office switch 12 communicates the digital symbols from the originating telephone 10 on a digital connection path 44 to the originating media gateway 14. In an exemplary embodiment, the well-known digital portion of the PSTN, which uses time-division multiplexing (TDM), is used as the digital connection path 44. For purposes of this description, the digital connection path will be referred to as the TDM connection path 44. The digital symbols communicated on the TDM connection path 44 are communicated in channels 50, each of the channels 50 corresponding to digital connections to individual telephones 40. In an exemplary embodiment, the digital connections are the well-known DS0 connections. Each channel CH0, CH1, CH2, etc. in the TDM channels 50 represents a timeslot dedicated to an individual call. One of ordinary skill in the art will appreciate that the number of DS0 channels is not limited to what is shown in FIG. 2A.

In the system in FIG. 2A, the originating media gateway 14 transcodes between the timeslot data of the TDM channels 50 and packetized data. In transcoding in a TDM-to-RTP direction, the timeslot data are placed in an RTP payload in each of a plurality of RTP packets 62*a* et seq. The payload for each RTP packet 62*a* is constructed by accumulating and encoding a set number of TDM samples, arriving sequentially from a single DS0 (one call). Conversely, in a RTP-to-TDM direction, the payload of each RTP packet 62*a* is decoded to recover the original TDM samples. The TDM samples are then transmitted as TDM channels 70 sequentially back into timeslots in the TDM network.

In an exemplary embodiment, the manner in which the TDM samples in the channels 50 are translated to RTP packets 62*a* et seq. depends on the choice of codec used to convert the analog voice signals on the subscriber line 42 to digital symbols. For example, G.711 encoding uses one byte per TDM sample. For a single voice call on one DS0 channel, one TDM sample arrives every 0.125 ms (i.e., the TDM sample is 0.125 ms in duration), giving 8 bytes per millisecond of RTP frame size, or 80 bytes per 10 ms frame size. By comparison, a G.729 codec can achieve compression of the TDM samples in the channels 50 yielding one byte per millisecond, or 10 bytes per 10 ms frame size. This is clearly more efficient in terms of RTP payload utilization. However, the combined overhead of the IP, UDP, and RTP headers is 40 bytes per IP packet (uncompressed). Thus in terms of size ratio of payload-to-header, the larger frame size (for equivalent TDM data) of G.711 is more efficient. To increase this ratio, the payload size must be increased and/or the header size must be decreased, for example by using header compression (described below with reference to FIG. 2C). In an exemplary embodiment, a preferred header compression algorithm addresses shrinking the header size while at the same time, the payload size is increased without increasing the frame size, for example, by allowing multiple frames to be carried in one IP packet. Since each frame corresponds to an RTP packet, this means multiple RTP packets per IP packet. In a preferred embodiment of the present invention, therefore, header compression is implemented in conjunction with stream (e.g. RTP) multiplexing.

In a VoIP system, the quality of the telephone connections degrades as the time to transport packets across the data network 30 increases. Accordingly, any delay that may be introduced in processing packets at the media gateways 14, 16 should be kept to a minimum.

One possible source of delay may be introduced by RTP multiplexing in building RTP payloads. The payload for each RTP packet 62*a* et seq. may include any number of TDM samples. In an exemplary embodiment, the number of TDM samples in the RTP packet 62*a* depends upon the per packet accumulation time, which in turn defines a frame size for each RTP packet 62*a* et seq. Since the first TDM sample in a frame waits for the last sample before the frame is complete, the frame size corresponds to a lower limit on a source of delay in transporting encoded TDM data over the IP network. Typical values of frame size in a VoIP system range from 5 ms to 30 ms (in steps of 5 ms), with 10 ms considered desirable from the point of view of low delay.

RTP packets that are built from a single-source RTP stream may magnify the delay resulting from the frame size. Another source of delay may result from waiting for RTP streams to complete the RTP packets. Therefore, the multiple RTP packets 62*a* et seq. in a single IP packet 60 preferably originate from different, but nearly simultaneously arriving RTP streams. RTP multiplexing optimally operates on RTP packets from multiple, different, but concurrent RTP streams in a single IP packet.

This advantageously highlights factors that identify RTP streams that may be candidates for RTP multiplexing. Because a single IP packet will be used for the multiple streams, the RTP packets to be multiplexed designate the same source and destination IP addresses to identify the originating and terminating media gateways 14, 16. Because the RTP streams are different (i.e. they carry audio for different calls), the RTP packets will designate different source and destination ports.

Exemplary embodiments of the present invention advantageously affect and take advantage of situations in which multiple, distinct, concurrent RTP streams are terminated between the same two IP endpoints. RTP packets 62*a* et seq. from the multiple streams may then be bundled or multiplexed into common IP packets. Depending upon the density achieved through multiplexing, these bandwidth optimization techniques may offer a substantial savings in bandwidth. In a network with fixed bandwidth, the savings may be used for the replay of lost IP packets, offering the added benefit of improved voice quality. In addition to an increased efficiency in payload-to-header ratio, the volume of traffic in terms number of IP packets may correspondingly be reduced. Since the routing and forwarding elements of an IP network perform processing on a per-packet basis, this method of RTP multiplexing may also help increase packet processing efficiency as well.

The multiplexed IP packet payload 63 containing concurrent streams forms a sort of superframe (e.g. IP packet 60) of RTP packets 62*a* et seq. Consequently, the RTP packets 62*a* et seq. bundled in each IP packet 60 may be subject to a delay corresponding to the time required to build the IP packet 60. Since the RTP streams are concurrent, or nearly concurrent, all of the multiplexed RTP packets 62*a* et seq. may be accumulated nearly simultaneously, and thus avoid incurring a cumulative delay of sequentially arriving RTP packets 62*a* et seq. In order to minimize delay, the time required to accumulate data in the payload of IP packet 60 should be shorter than the sum of the times required to accumulate each of the RTP packets 62*a* et seq. that comprise the payload. Otherwise the bandwidth optimization of RTP multiplexing would come at the expense of a corresponding increase in delay. It is to be understood that in actual implementations, strict simultaneity may be difficult to achieve and not actually necessary, however, the closer the streams are to being simultaneous the lower the latency in building the superframe 60.

Referring to FIG. 2B, media combination functions such as RTP multiplexing may be performed on connections between a first plurality of IP telephones 36*a*, 36*b*, 36*c* and a second plurality of IP telephones 38*a*, 38*b*, 38*c*. The first plurality of IP telephones 36*a*, 36*b*, 36*c* connect to a first IP media relay server 15 by a corresponding first plurality of data connections 43. The first IP media relay server 15 connects to a second IP media relay server 17 over the data network 30 on a multiplexed telephony connection 45. The IP media relay servers 15, 17 perform the RTP multiplexing functions performed in VoIP connections by the media gateways 14, 16. The first and second plurality of data connections 43 and 53, respectively, preferably carries voice signals as RTP packets precluding the need for transcoding at the IP media relay servers 15, 17. The IP media relay servers 15, 17 build an IP packet 60' by multiplexing RTP streams (e.g. data connections 43) each designating different source and destination IP addresses to the IP telephones 36, 38, but designating the same source and destination IP addresses to the endpoint IP media relay servers 15, 17. The signaling required to determine that IP media relay servers 15 and 17 may be used for transporting data between connections 43 and 53, as well as the signaling required to establish the telephony connection 45, could be carried out using IP protocols such as SIP. But other protocols could be used.

Additional gain in bandwidth conservancy may be achieved by using header compression. FIG. 2C depicts operation of one example of header compression that makes advantageous use of exemplary embodiments of the present invention. As discussed above, header compression and stream multiplexing are advantageously implemented on multiple, distinct and concurrent media streams between common endpoints. As shown in FIG. 2C, such streams more effectively implement media combination functions such as header compression and RTP multiplexing.

FIG. 2C shows RTP packets 62a, 62b, 62c, 62d and the IP packet 60 that may be formed using exemplary media combination functions. The first RTP packet 62a comprises an RTP packet header 66a and an RTP packet payload 68a. The second RTP packet 62b comprises a second RTP packet header 66b and a second RTP packet payload 68b. The third RTP packet 62c comprises a third RTP packet header 66c and a third RTP packet payload 68c. The fourth RTP packet 62d in FIG. 2C represents the nth packet in a stream of n RTP packets. The RTP packets 62a et seq. are multiplexed and added as the IP packet payload 63. The RTP packet headers 66a et seq. are compressed by incorporating the common RTP packet header information into the IP packet header 61.

One of ordinary skill will appreciate that the IP packet 60 may include information not shown, such as information and data required by other protocols that may be used to effect communication of the packet over the data network. For example, the UDP protocol may be used for transmission of the protocol over the data network. The packet header information that is compressed using header compression may include information involving other protocols (not shown in FIGS. 2A-2C).

The RTP packet payloads 68a et seq. contain the data communicated in TDM channels that correspond to the telephone connection on the RTP packets 62a. In an alternative embodiment involving IP telephony as shown in FIG. 2B, the RTP packet payloads 68a et seq. contain RTP packet payloads from the data connections 43 from the IP telephones 36. The RTP packet headers 66a et seq. contain information used to ensure proper delivery of each RTP packet 62a et seq. to its proper destination. For example, the first RTP packet header 66a may include an IP address for the terminating media gateway, and a stream port identifier (e.g. STR Port 0) to identify a destination (e.g. a stream port identifying a digital modem) to which the packet will be sent.

The RTP packet headers 66a et seq. may contain common information resulting from the condition that the streams are multiple, common, distinct and made between the same two endpoints. For example, the IP address (or other identifier) for the terminating media gateway will be the same for each RTP packet 62a et seq. since the streams have common endpoints as described above with reference to FIG. 2A. An exemplary embodiment of header compression involves incorporating all of the common information (e.g. IP address of the terminating media gateway) into the IP packet header 61. The stream port identifier in each RTP packet header 66a et seq. may be unique since the streams, and therefore the RTP packets 62a et seq., are distinct and intended for distinct destination ports. The unique information may remain as a modified RTP packet header 66a' et seq. with modified RTP packets 62a' et seq. in the IP packet payload 63.

A variety of techniques may be used for implementing both RTP multiplexing and header compression. For example, header compression may be implemented by creating a first profile header 72a et seq. containing information that would be common between RTP streams between common endpoints when a new stream (e.g. RTP packets 62a et seq.) is initiated between two endpoints. As each new stream is added to the endpoints, the profile header 72a et seq. is compared to existing profile headers, or to the IP packet header 61, to identify commonality between the streams. When sufficient commonality is identified between profile headers, the streams they belong to are combined using RTP multiplexing. The combination may involve removing the common information from the RTP headers 66a et seq. The combination may also involve adding the RTP packet with the unique header information (e.g. modified RTP packets 62a' et seq.) and their payload to the IP packet payload 63.

For specific embodiments of techniques for implementing RTP multiplexing and/or header compression, reference is made to:

U.S. patent application Ser. No. 09/322,845, A Profile-based Method for Packet Header Compression in a Point to Point Link, Jerry Mahler, Jacek Grabiec, Michael Borella, Ikhlaq Sidhu;

Thompson, B., et al., "Tunneling multiplexed Compressed RTP," IETF draft-ietf-avt-tcrtp-04.txt, 2001;

An RTP Payload Format for User Multiplexing, J. Rosenburg, H. Schulzrinne, IETF Draft, draft-ieff-avt-aggregation-00.txt, November 1998; and User Multiplexing in RTP Payload Between IP Telephony Gateways, B. Subbiah, S. Sengodan, IETF Draft, draft-ieff-avt-mux-rtp-00.txt, August 1998;

all of which are incorporated in their entirety by reference herein. One of ordinary skill in the art will appreciate that these protocols are noted here as examples of techniques that benefit from exemplary embodiments of the present invention to optimize bandwidth utilization. One of ordinary skill in the art will further appreciate that other examples may exist.

In addition, one of ordinary skill in the art will appreciate that reference has been made herein to RTP multiplexing as involving the RTP protocol as an example. One of ordinary skill in the art is directed to the RTP specification (Schulzrinne, H., et al., "RTP: A Transport Protocol for Real-Time Applications," IETF RFC 1889, 1996, incorporated herein by reference) for descriptions of RTP packet header and payload requirements. It is to be understood that the term "RTP multiplexing" is an example of stream multiplexing which includes the formatting of stream packets into communications packet payloads (e.g. IP packet payloads) so that one communications packet may communicate stream packets from different streams in its payload.

While exemplary optimization techniques have been described, it is to be understood that any optimization technique that takes advantage of the existence of multiple, concurrent (or simultaneously arriving), or distinct media streams may advantageously be used in embodiments of the present invention.

2. Bandwidth Optimization Information

As described above with reference to FIGS. 2A and 2B, exemplary bandwidth optimization techniques find advantageous implementation in systems in which multiple, distinct and concurrent media streams are constructed between common endpoints. Exemplary embodiments of the present invention affect and preferably make such media streams more common. For example, as media streams are created for the data transport of VoIP telephony connections, certain information about the media streams is maintained for each media gateway. In exemplary VoIP telephony systems, the softswitches (e.g. originating and terminating softswitches 18, 20 in FIG. 1) control the initiation of the data network portions of VoIP telephony connections by sending messages to media gateways (e.g. originating and terminating media gateways 14, 16) within their control. The softswitches may access the information about the media streams being handled by the media gateways within their control during initiation of new media streams to ensure that distinct and concurrent media streams between common endpoints are aggregated to communicate by stream multiplexing. The information accessed may include any information that any network device or devices, such as a softswitch and/or media gateway, would use to implement bandwidth optimization techniques.

Exemplary methods for exchanging information between the softswitches 18, 20 and the media gateways 14, 16 are illustrated by the first and second message exchanges 21, 23 shown in FIG. 1. Referring to FIG. 1, in one exemplary embodiment, the originating and terminating media gateways 14, 16 may communicate media gateway registration messages when they are initialized for service. In a media gateway registration message, for example, the originating media gateway 14 may send a media gateway registration message to the originating softswitch 18 when it starts up for service. The softswitch 18 receives the message and registers the media gateway 14 for service. The media gateway registration message may contain a media combination function indicator having a first value indicating that the media gateway 14 is capable of performing at least one bandwidth optimization technique, or a second value that indicates that the media gateway 14 is not able to perform any media combination function. The media combination function indicator may also contain one or more of a plurality of first values that may identify particular media combination functions that the media gateway 14 may implement. Alternatively, the media gateway registration message may include a separate data structure containing identifiers of one or more media combination functions that the media gateway 14 is capable of implementing. In exemplary embodiments, the media gateway registration message may be implemented using H.248 or MGCP. However, other suitable signaling protocols may be used.

Alternatively or additionally, the softswitches 18, 20 and the media gateways 14, 16 may perform message exchanges 21, 23 during call handling negotiation in the initiation of a telephone connection. For example, the originating softswitch 18 may communicate signaling messages to the terminating softswitch 20 to initiate the media session. In the process, the terminating softswitch 20 may send a query message to the terminating media gateway 16 to determine whether it is capable of implementing media combination functions. In exemplary embodiments, the terminating softswitch 20 may be able to select from a number of media gateways and information learned as a result of this query message may be used to select the media gateway best suited for implementing media combination functions. The query information may include an identifier of a media gateway (e.g. the originating media gateway) for which the softswitch 20 is seeking an endpoint media gateway with which to establish a media session. In response to the query message, the terminating media gateway 16 (which may at this point still be a "candidate" media gateway) may send a connection information message that may include any of the following information:

media combination function Indicator (First Value=Indicates that MG is capable of using media combination function, or Identifiers of techniques available to the MG; Second Value=MG Incapable of techniques)

media combination function Identifier (MG capable of at least one media combination function)

Number of media sessions presently in process with the originating media gateway media combination functions being used for each media session in process Any other information that would inform the softswitch of distinct, nearly simultaneous media sessions between the originating media gateway 14 and the (still) candidate media gateway 16.

The connection information message may not include the first two items in the above list if such information was communicated to the softswitch during registration. It may also be the case that the softswitches 18 and 20 actively maintain some or all of the connection status information on their respective media gateways 14, 16. In exemplary embodiments, the connection information message may be implemented using H.248 or MGCP, SIP. However, other suitable signaling protocols may be used.

Figure 3:
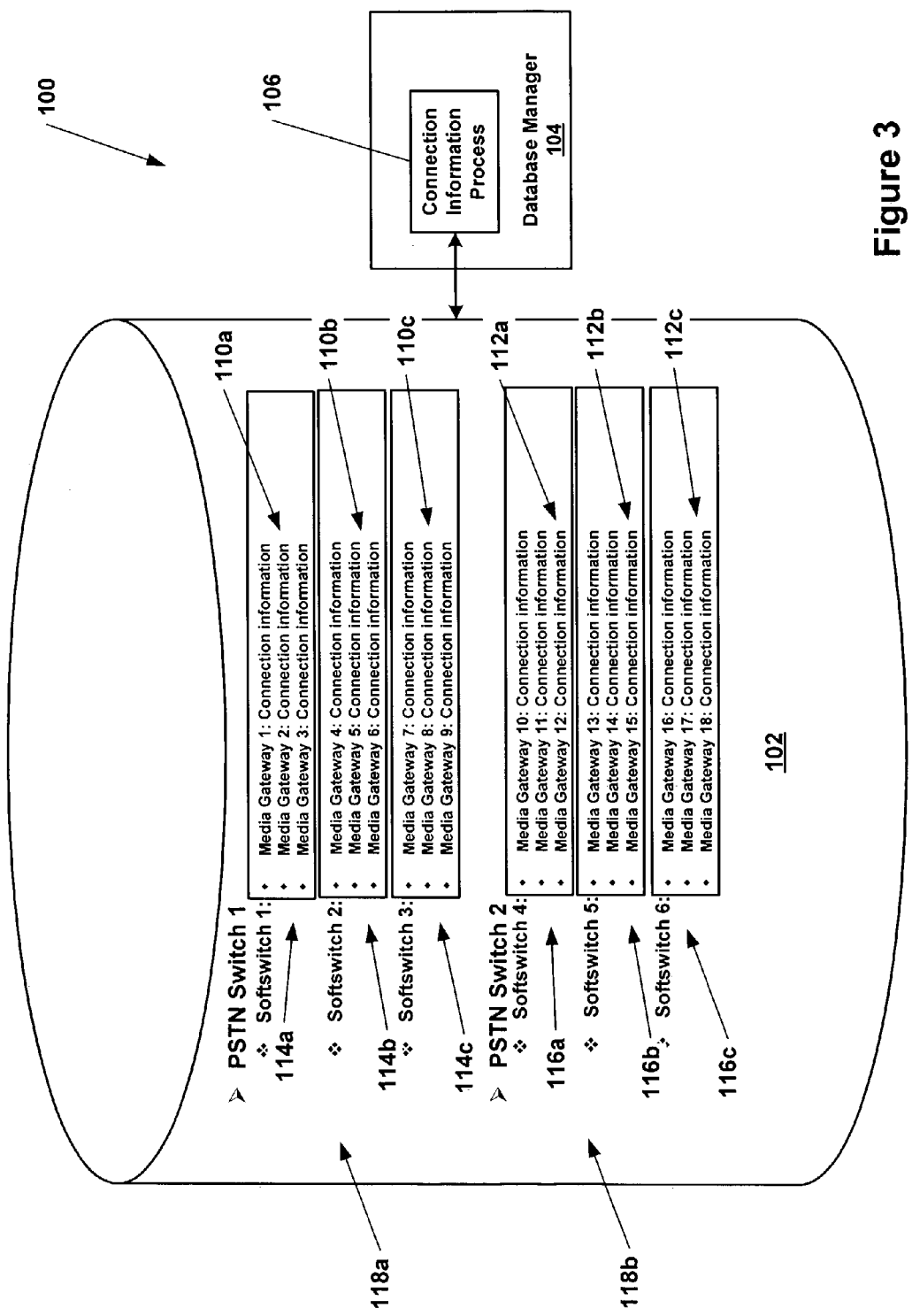
FIG. 3 depicts an exemplary database and manager containing information organized to effect stream multiplexing and header compression.

FIG. 3 depicts a connection information system 100 containing information organized to effect stream multiplexing and header compression in accordance with an exemplary embodiment. The connection information system 100 shown in FIG. 3 includes a database 102 and a database manager 104, which includes a connection information process 106. One of ordinary skill in the art will appreciate that the connection information system 100 need not be implemented with a database nor accessed using a database manager. For example, the connection information stored in the connection information system 100 may be organized as objects in an object oriented system, or as data structures accessed using well-known programming techniques. In a preferred embodiment, the connection information system 100 is integrated with a directory server that may be used in a VoP telephony system to store information and records that map telephone numbers to IP addresses of media gateways or other endpoints for connections. In exemplary embodiments, requests for information stored in the connection information system 100 conform to a standard protocol such as the Remote Authentication Dial-In User Service (RADIUS), or any other suitable information request protocol. For example, a proprietary protocol may also be used, provided information system 100 and any application or system that requests the information both incorporate the appropriate interfaces to communicate with the proprietary protocol. Alternatively, the connection information system 100 may be integrated in the softswitches or in any other network device accessible to the softswitches. One of ordinary skill in the art will appreciate that more or less information may also be stored in the connection information system 100.

As shown in FIG. 1, the softswitches 18, 20 may access the information in the database 102 to determine an optimal routing based on a maximum probability that one of any media combination functions could be used for any given call. Typically, the softswitches 18, 20 may communicate with the end office (e.g. end office switch 12, 32) to which the caller, or originating telephone 10, is connected. The signaling communication may proceed over a direct connection such as PRI or indirectly, over an SS7 network. Typically, media gateways have media connections such as inter-machine trunks (e.g. DS3's, or any other TDM-based connection). The database 102 in FIG. 3 stores connection information for groups of media gateways as first and second media gateway records 110a et seq. and 112b et seq. The media gateway records 110a et seq. and 112b et seq. may be included in softswitch records (e.g. first softswitch records 114a et seq. and second softswitch records 116a et seq.). Each set of softswitch records 114a et seq. and 116a et seq. may be grouped with PSTN switch records (e.g. a first switch record 118a and a second switch record 118b) for the end office switches that may have access to the softwitches. Records may also contain information regarding which DS0's are currently in use for calls, which DS0's are available for calls, and/or any other suitable information. In an exemplary embodiment, the connection information process 106 preferably analyzes the connection information in the media gateway records 110a-c and 112a-c. The connection information process 106 uses the connection information to determine which media gateway identified by the media gateway records 110a-c and 112a-c may, with the originating media gateway 14 as another endpoint, best provides multiple, concurrent and distinct media streams. The originating media gateway 14 may therefore connect media streams with the selected terminating media gateway 16 using media combination functions. Table A shows examples of the types of data that may comprise the connection information that may be analyzed to select the terminating softswitch 20 and/or the terminating media gateway 16. As Table A illustrates, multiple candidate terminating media gateways and/or multiple candidate softswitches may exist. It this context, it is understood that terminating softswitch 20 and/or terminating media gateway 16 may actually represent a plurality of softswitches and/or media gateways that are capable of providing terminating functions.

TABLE A

| | |
|---|---|
| Endpoint Media gateway | MG_a, MG_b |
| Session information | MG_a |
| Number of distinct sessions | 5 |
| Profile Header | xxxxxxxxxx |
| End Switch ID | EO1 |
| Softswitch ID | SS1 |
| media combination functions | Type A RTP multiplexing with Type B Header Compression |
| Policy | High Priority |
| Session information | MG_b |
| Number of distinct sessions | 4 |
| Profile Header | yyyyyyyy |
| End Switch ID | EO1 |
| Softswitch ID | SS2 |
| media combination functions | Type A RTP multiplexing with Type C Header Compression |
| Policy | Medium Priority |

Table A includes the type of connection information data that may be maintained in a media gateway record 110a-c, 112a-c as shown in FIG. 3. These data are dynamic in nature, since, for example, the number of sessions would be changed each time a session is added or deleted. The media gateway records 110a-c, 112a-c are analyzed when the media gateway they are associated with is designated as the originating media gateway 14. Table A may then be analyzed to determine if there is an endpoint media gateway with which media combination functions may be implemented. One of ordinary skill in the art will appreciate that the values indicated in Table A for each data type is purely given as an example for purposes of providing explanation.

As shown in Table A, the session information identifies media gateways with which the originating media gateway 14 is already an endpoint media gateway. Each endpoint media gateway in Table A becomes a candidate media gateway to become the terminating media gateway 16 in a new session. As the connection information in Table A is being analyzed for purposes of selecting the terminating media gateway, each endpoint media gateway having connection information to analyze becomes a candidate media gateway. In this context, the softswitch with which the candidate media gateways are identified become candidate softswitches, unless the terminating softswitch is predetermined.

For each candidate media gateway, the connection information may include the number of media sessions in progress with the originating media gateway 14. In exemplary embodiments, media combination functions may preferably be implemented on media gateways having the greatest number of media sessions. Therefore, the higher the number of media sessions in progress, the better the candidate media gateway for purposes of bandwidth optimization. However, other considerations besides the number of sessions in progress may affect the degree of optimization that may be achieved. In the example shown in Table A, the candidate media gateway identified as MG_a may be a better candidate for use as a terminating media gateway 16 because it has a greater number of media session in progress than does MG_b. It is to be understood that other criteria besides the number of sessions may be used to optimize RTP multiplexing. For example, if a constraint on the maximum number of multiplexed sessions exists, then other factors may need to be considered.

In addition, the connection information may include a profile header. If certain header compression techniques that use header profiles are used, the profile header may be used to compare a new profile for a stream being initiated with the profile header being used by the sessions in progress. The greater the match, the more common information is contained in the IP header for the new stream and the IP header for the media sessions in progress. Therefore, the stronger a candidate that media gateway becomes for being a terminating media gateway.

The media combination functions being used in the sessions in progress may also be identified. If the originating media gateway cannot implement the media combination functions being used in the sessions in progress, then the designated endpoint media gateway would not be a good candidate for a terminating media gateway with the originating media gateway.

A policy identifier may identify whether bandwidth optimization is high priority or low priority. The policy identifier may provide a sort of weight that may tilt a selection one way or another depending on implementation details that a provider may want to have considered. That is, there may be other candidate selection criteria besides the desire to maximize RTP multiplexing.

One of ordinary skill in the art will appreciate that neither the structure nor content of Table A are intended to be limiting. Exemplary embodiments may be organized in any suitable fashion and may include more or less information depending on the VoP telephony system infrastructure and on the types of media combination functions that may be used. In addition, the information used to enable this method may be distributed across multiple softswitch elements and/or element types.

In addition, FIG. 3 shows only one example of the many ways in which the connection information for the media gateways may be stored.

Exemplary embodiments of the system 5 shown in FIG. 1 advantageously use an analysis of connection information relating to candidate softswitches and media gateways to affect conditions in which the use of media combination functions may be maximized. Much of the connection information (e.g. information in Table A) is acquired and maintained dynamically as media sessions are added or removed between media gateways. However, some information-primarily that relating to the identification of the available network devices (i.e. softswitches, media gateways, directory server, etc.)—may be acquired statically or dynamically.

For example, the data structure illustrated in FIG. 3 for the connection information system 100 may be configured completely statically during provisioning, partially statically, or dynamically as connections are made. Three scenarios may be involved:

Total provisioning. Every softswitch may be statically provisioned with the identifying information about all the media gateways in the system. Similarly, the directory server could be provisioned with this information. In the simplest case, every media gateway would possess identical capabilities (e.g. bandwidth optimization techniques, protocols used, etc.).

Partial provisioning. Each softswitch is statically provisioned with the identifying information about the media gateways under its control. If a softswitch needs information about a media gateway not under its control, it could learn that information from the controlling softswitch as part of an active procedure (e.g., system startup, or new call setup, or a predefined request messaging procedure). Similarly, the directory server could learn identifying information from each softswitch as part of an active procedure.

No provisioning. Each softswitch learns identifying information about the media gateways under its control as part of an active procedure. If a softswitch needs information about a media gateway not under its control, it could learn that information from the controlling softswitch as part of a different active procedure (e.g., system startup, or new call setup). Similarly, the directory server could learn identifying information from each softswitch as part of an active procedure.

The connection information system 100 may be accessed during the initiation of a VoIP telephone connection; for example, between the originating telephone 10 and the terminating telephone 40 (as shown in FIG. 1). Referring to FIG. 1, the originating softswitch 18 receives a request to establish a data network connection to communicate the audio medium on a media stream between the originating media gateway 14 and the terminating media gateway 16. The originating softswitch 18 sends signaling messages to the terminating softswitch 20 that controls the terminating media gateway 16.

The originating softswitch 18 may perform the optimal routing by either selecting the terminating softswitch 20, or by selecting, from among multiple media gateways controlled by the terminating softswitch 20, the terminating media gateway 16. The originating softswitch 18 may need to search for the terminating softswitch 20 from among several softswitches that may connect to the end office switch 32 connected to the terminating telephone 40. Alternatively, the terminating softswitch 16 may be predetermined during provisioning or, it may be the only softswitch served by the terminating end office switch 32.

If the terminating softswitch must be selected, several criteria may be used to determine which softswitch to select as the terminating softswitch 20. For example, the terminating softswitch 20 should be able to communicate with the terminating end office switch 32. The originating softswitch 18 may receive a terminating telephone identifier, which may be used (for example, where the terminating telephone identifier is a directory telephone number) to identify the terminating end office switch 32. The originating softswitch 18 may then access the connection information system 100 (shown in FIG. 3) to identify the softswitches from which it may select the terminating softswitch 20. For example, if the terminating end office switch 32 is described using the first switch record 118*a*, the terminating softswitch 20 may be either one of the softswitches identified in the first softswitch record 114*a*, the second softswitch record 114*b*, or the third softswitch record 114*c*.

The originating softswitch 18 is described above as performing a selection process to select the terminating softswitch 20. The originating softswitch 18 may or may not be the component that performs the selection process. In one exemplary embodiment, the originating softswitch 18 may include the connection information system 100 as part of the same network device or as part of a locally accessible network device. Alternatively, the connection information system 100 may be part of a backend server, such as the directory server 34 (in FIG. 1), that may be used to provide services to the network through APIs to the originating softswitch 18. Basic services may include directory mapping of phone numbers to IP addresses, billing and records, and authentication. The originating softswitch 18 may retrieve the connection information and perform the connection information process 106 to select the terminating softswitch 20 (and/or the terminating media gateway 16).

In a further alternative embodiment, the originating softswitch 18 may send a request to the directory server 34 for the terminating softswitch 20 (and/or the terminating media gateway 16). The directory server 34 would then perform the connection information process 106 and provide the originating softswitch 18 by either identifying the best candidate, or by providing a list (prioritized or not) of candidate terminating softswitches from which the originating softswitch 18 may select one.

C. Exemplary Embodiments of Network Devices

1. Softswitch

Figure 4:
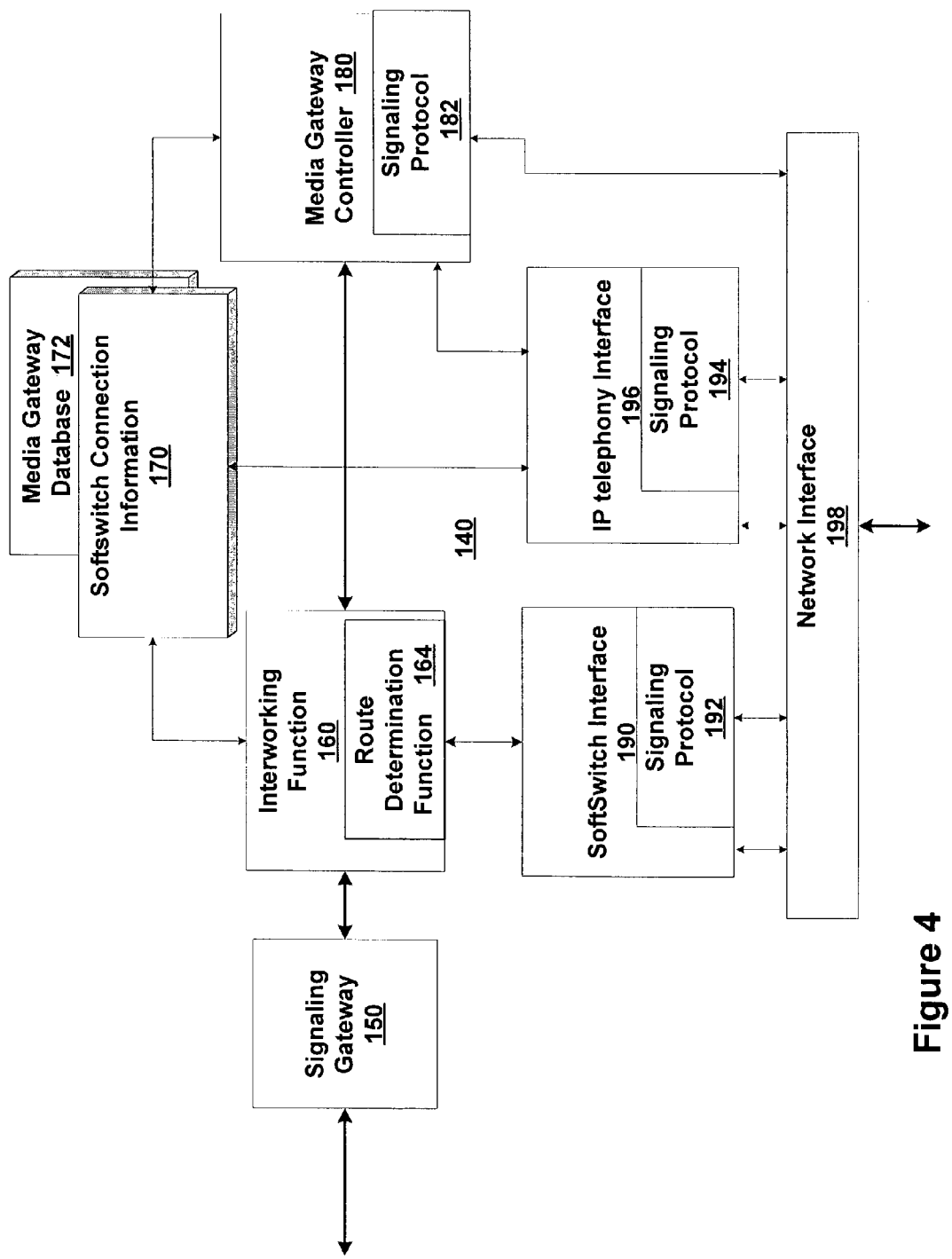
FIG. 4 is a block diagram of a softswitch in the system shown in FIG. 1.

FIG. 4 shows a block diagram of a softswitch 140 similar to the originating and terminating softswitches 14, 16 shown in the system in FIG. 1. The softswitch 140 in FIG. 4 advantageously implements call route determination techniques in accordance with exemplary embodiments to affect the implementation of media combination functions.

The softswitch 140 includes, without limitation, a signaling gateway 150, an interworking function 160, a softswitch connection information system 170, a media gateway controller 180, a softswitch interface 190, an IP telephony interface 196, and a network interface 198.

The signaling gateway 150 provides an interface to an end office switch (e.g. originating and terminating end office switches 12, 32) or tandem switches via SS7 (or possibly PRI). The softswitch 140 receives messages from the end office switch, such as call initiation requests, call termination requests, and other messages associated with controlling a telephone call from the PSTN end office switch. The signaling gateway 150 may also receive call control messages (such as call initiation and call termination messages) from another softswitch to send to the end office switch. In a preferred embodiment, the signaling gateway 150 translates between SS7 (ISUP) (switching nodes 22, 24 in FIG. 1) and the IP interworking function 160. The inter-working function 160 interprets the translated messages from the signaling gateway 150 and takes appropriate action; e.g., initiation and set up of the data network portion of the VoIP call. The softswitch 140 may include within the same platform (computer or local network) the connection information process 170 with access to a media gateway database 172 to analyze the media gateway connection information as described above. Alternatively, a request may be made to the directory server 34 (See FIG. 1) for identities of network devices (e.g. terminating softswitch 20 and/or terminating media gateway 16) to use for optimal routing. A route determination function 164 may be implemented to request the connection information, such as for example, the connection information reflected in Table A, and perform the analysis required to select the terminating network devices.

The softswitch 140 also includes a media gateway controller 180, which provides remote device control of the actions and media resources of the originating or terminating media gateways 14, 16. This interface could be implemented with a signaling protocol 182 that may implement the H.248 protocol, but other protocols are possible (e.g., MGCP).

The softswitch 140 communicates with other softswitches via the softswitch interface 190. The softswitch interface 190 may be used for IP-based call control, and could be implemented with a signaling protocol 192 that implements the SIP protocol (again, as illustrated) by a SIP Server. Alternatively, the H.323 protocol could be implemented with an H.323 Gatekeeper.

The softswitch 140 may communicate with a plurality of IP telephones (see IP telephones 36, 38 in FIG. 1) via the IP telephony interface 196. The IP telephones 36, 38 are telephones that are capable of communicating exclusively over the data network 30, but may also connect on the PSTN via a media gateway. The IP telephony interface 196 preferably implements a signaling protocol 194 and may include an additional SIP Server.

The network interface 198 provides low-level data network interface functions and may implement whatever communications protocol would be suitable in a selected data network 30.

Figure 5:
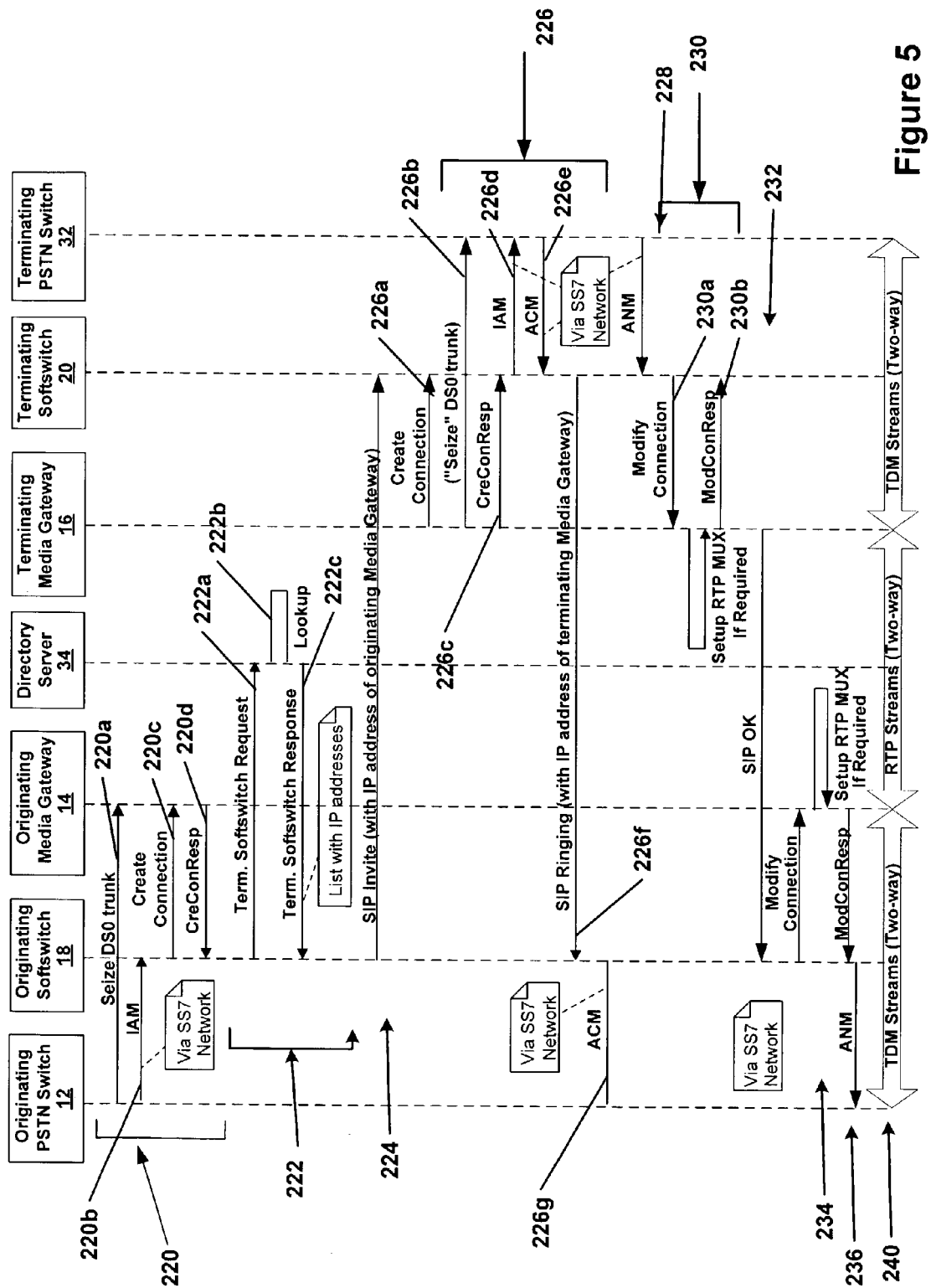
FIG. 5 shows messages communicated during a call initiation that implements call route determination to maximize the use of bandwidth optimization techniques in accordance with exemplary embodiments.

D. Example Implementation of Call Routing During Call Initiation to Effect Media Combination Functions FIG. 5 depicts operation of the system 5 in FIG. 1 as a call is setup. FIG. 5 depicts operation using a simplified call message flow with reference to examples of actual messages mixed in. The following description generally summarizes the progression of messages and actions based on a variety of standards and protocols that are known to those of ordinary skill in the art (e.g. SS7, SIP, TDM, RTP, etc.).

In a first series of messages at 220, a call is placed through the originating end office switch 12, which chooses a DS0 trunk (TDM timeslot) connected to the originating media gateway 14 at 220a. A CIC code associated with the selected DS0, as well as with the dialed number is passed to the originating softswitch 18 through the first signaling network node 22 in an IAM message 220b. The originating softswitch 18 translates the IAM, and instructs the originating media gateway 14 to create a connection at message 220c, which associates an RTP port with the DS0 chosen by the originating end office switch 12 and enables RTP-to-PSTN data to flow. The originating media gateway 14 responds affirmatively at message 220d once the connection is successfully created.

In the second series of messages 222 shown in FIG. 5, the originating softswitch 18 sends a request at message 222a to the directory server 34 to identify a softswitch that can complete the VoIP call as the terminating softswitch 20. The directory server uses a lookup 222b to map the dialed number to one or more candidate softswitches. Since the dialed number identifies the terminating end office switch 32, the candidate terminating softswitch or softswitches identified must control one or more media gateways that are connected (possibly through tandem switches) to the terminating end office switch 32. The list of one or more candidate terminating softswitches is returned to the originating softswitch 18 at message 222c. Depending upon what, if any, routing policies are in place, and how they are implemented, the directory server 34 might assign a priority to the softswitches on the list. Such policies could include exemplary techniques for effecting media combination under discussion herein. In an exemplary embodiment, the choice of the terminating softswitch 20 is made by analyzing the connection information (e.g. connection information in Table A) to select the softswitch that controls the media gateway with which the originating media gateway 14 may have the most multiple, concurrent and distinct media sessions using the same media combination functions. In an alternative embodiment, no choice is necessary if the directory server 34 is provisioned to return only one specific softswitch.

At message 224, the originating softswitch 18 chooses the terminating softswitch 20 from the list, and sends it a request to set up the terminating side of the VoIP call. In this example, a SIP "Invite" message is used; other protocols and messages may also be used. The request message 224 preferably includes the dialed number, the IP address of the media interface of the originating media gateway 14, and the RTP port of the connection created with messages 220.

The terminating softswitch 20 chooses an appropriate media gateway under its control as the terminating media gateway 16 to complete the call to the terminating end office switch 32. The choice of the terminating media gateway 16 may be made by analyzing the connection information (e.g. connection information in Table A) to select the media gateway with which the originating media gateway 14 may have the most multiple, concurrent and distinct media sessions using the same media combination functions. FIG. 5 shows an example where the terminating softswitch 20 performs the connection information process 100 (see FIG. 3), however, in alternative embodiments, the terminating softswitch 20 may request the connection information needed to make the choice from the directory server 34 or, it may request that the directory server 34 perform the analysis and choice.

The terminating softswitch 20 also chooses a channel corresponding to a specific DS0, and instructs the terminating media gateway 16 to create a connection at message 226a. This associates an RTP port with the DS0 at the terminating media gateway 16 at 226b effectively seizing the TDM timeslot. When the terminating media gateway 16 responds affirmatively at message 226c, the terminating softswitch 20 translates the chosen DS0 to a CIC code, creates an IAM message 226d, including this CIC code and the dialed number, and passes it to the terminating end office switch 32 through the SS7 network.

The terminating end office switch 32 initiates the call to the terminating telephone 40 (shown in FIG. 1) at the dialed number, causing it to ring. The terminating end office switch 32 also uses the CIC code to identify the TDM timeslot for the call. The terminating end office switch 32 then acknowledges the IAM with an ACM back to the terminating softswitch 20 through the SS7 network at message 226e. The terminating softswitch 20 translates the ACM 226e into an intermediate, affirmative reply to the request from the originating softswitch 18 for call setup made with message 224. In this example, the request was a SIP "Invite," so the reply 226f is a SIP "Ringing." Other protocols and messages are possible. The reply message contains the IP address of the media interface of the terminating media gateway 16, as well as the RTP port of the connection created at messages 226a-c. When the reply is received by the originating media gateway 14, it translates it into an ACM 226g and sends it to the originating end office switch 12 through the SS7 network. The originating end office switch 12 then transmits a ringing signal to the phone that dialed the number.

When the called party answers the phone, the terminating end office switch 32 generates an ANM message 228 and passes it to the terminating softswitch 20 through the SS7 network. At this point, the path between the terminating phone 40 and the terminating media gateway 16 is full-duplex TDM.

The terminating softswitch 20 instructs the terminating media gateway 16 to modify the connection it created in messages 226a-c at message 230a. This prepares the connection for full-duplex data flow between the RTP port and the DS0. At this point, if RTP multiplexing is to be used on the VoIP call, the terminating media gateway 16 would execute the necessary steps to set it up. The terminating media gateway 16 responds affirmatively to the terminating softswitch 20 once all the modification steps are successfully completed at message 230b.

The terminating softswitch 20 translates the ANM 228 into an affirmative reply 232 to the request from the originating softswitch 18 for the call setup message 224. In this illustration, the request was a SIP "Invite," so the reply 232 is a SIP "OK." Other protocols and messages are possible.

At messages 234, the originating softswitch 18 instructs the originating media gateway 14 to modify the connection it created with messages 220a-c, which prepares the connection for full-duplex data flow between the RTP port and the DS0. At this point, if RTP multiplexing is to be used on the VoIP call, the originating media gateway 14 would execute the necessary steps to set it up. The originating media gateway 14 responds affirmatively to the terminating softswitch 20 once all the modification steps are successfully completed. At this point, a full-duplex RTP session is established between the originating and terminating media gateways 14, 16. Additionally, if RTP multiplexing is enabled on this VoIP call, the RTP streams would be part of a multiplexed bundle with other RTP streams between these two media gateways 14, 16.

The originating media gateway 14 translates the reply 232 from the terminating media gateway 16 (in this example, a SIP "OK") into an ANM 236, and sends it to the originating end office switch 12 through the SS7 network. The path between the originating phone 10 and the originating media gateway 14 is made full-duplex TDM.

The entire, end-to-end path between the originating and terminating phones is now full-duplex at 240. The segment between the Media Gateways is VoIP (RTP streams), and the segments between the phones and the Media Gateways are TDM.

One of ordinary skill in the art will appreciate that this is an illustration of one example of a call flow and that details may be different for an actual call flow in a real system. In addition, there may be additional messages and steps, and some alternatives to the ordering of the steps. Other system elements may also have functions; e.g., a billing and records server.

The actual steps for activating RTP multiplexing on any given call may vary depending, for example, upon the particular multiplexing method used, or whether the call is the first between the two IP endpoints or is being added to an existing multiplex stream. There may be other details that effect the specific steps. Further, it may also be possible to phase the initiation of RTP multiplexing. Different configurations or implementations may also use different phasing strategies (i.e. when to start, etc.).

E. Configuration Issues

In the example described above with reference to FIG. 5, the directory server 34 provided the originating softswitch 18 with the identity of the terminating softswitch 20. In exemplary embodiments, routing functions performed by the softswitches may or may not involve analysis of connection information relating to media gateways under the control of the originating softswitch 18 and candidate softswitches. Alternative embodiments for performing routing functions are described below with reference to FIGS. 6 and 7.

1. Single Terminating Softswitch

Figure 6:
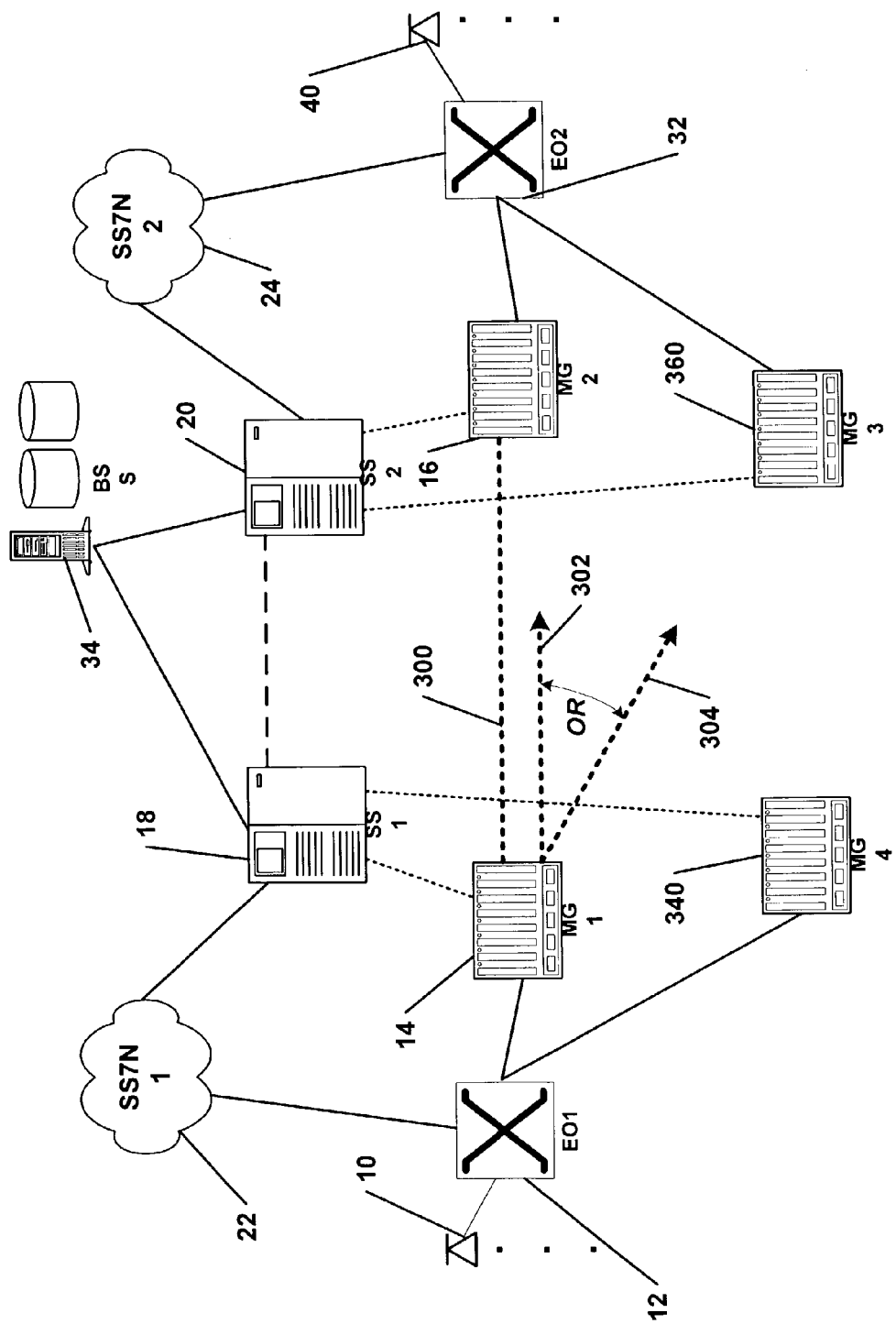
FIG. 6 shows operation of an exemplary embodiment of the present invention using the system in FIG. 1.

In the example described above with reference to FIG. 5, the originating softswitch 18 received the identifier of the terminating softswitch 20 from the directory server 34 at messages 222. FIG. 6 shows examples of connections that may be made during a call route determination process during call initiation wherein the originating softswitch 18 knows or is provided with only a single terminating softswitch 20 with which to initiate the data portion of the telephone connection.

The single-terminating softswitch response may occur if each end office switch is served by only one softswitch out of possibly a multitude in the system, or it may be a policy characteristic of the directory server 34.

In FIG. 6, telephone 10 originates a call at originating end office switch 12 and its termination is terminating end office switch 32. The first softswitch 18 is the originating softswitch 18. The originating softswitch 18 may be provisioned to identify the second softswitch 20 as the terminating softswitch 20. Alternatively, the second softswitch 20 may be identified to the originating softswitch 18 by the directory server 34 as being the terminating softswitch 20. The originating softswitch 18 may send a SIP "Invite" message to the terminating softswitch 20.

In this example, the originating end office switch 12 is shown to have chosen first media gateway 14 to be the originating media gateway. Further, for purposes of this example, it is assumed that the originating media gateway 14 already has one RTP session 300 established to terminating media gateway 16. This example scenario is used in order to illustrate an exemplary embodiment of call route determination in the circumstance in which the presence, and specific endpoints, of pre-existing calls influence the routing decision. It should be understood that end office switch 12 might be able to select a different media gateway, for example, the fourth media gateway 340, to be the originating media gateway. It is further possible that such a choice might result in a media gateway with no pre-existing calls to specific endpoints that would influence the call route determination.

To be connected as a VoIP call, either second media gateway 16 or third media gateway 360 may be candidate terminating media gateways. These two media gateways 16, 360 have a connection to the terminating end office switch 32. They are also controlled by the terminating softswitch 20. The choice between the two candidates may be made by the terminating softswitch 20, or the terminating softswitch 20 may request that the directory server 34 perform the selection. Either way, the selection is preferably based on an analysis of connection information relating to the candidate media gateways. In an exemplary embodiment, the connection information analyzed may include the information identified above with reference to Table A.

Two possible connections may be made: a first connection 302 between the first and second media gateways 14, 16; or a second connection 304 between the first and third media gateway 14, 360. The fundamental rule is to favor the IP path which has the most existing RTP streams established to the originating Media Gateway. In the example shown in FIG. 6, the choice favors the connection which has the most existing RTP sessions established to the originating media gateway 14. The originating media gateway 14 has a first RTP session 300 already established with the second media gateway 16 and no RTP sessions established with the second candidate media gateway 360. Therefore, second media gateway 16 is preferably chosen as the terminating media gateway.

However, there could be other policy factors that are applied by the terminating softswitch 20 (or directory server 34) when choosing the terminating Media Gateway. Factors such as load balancing and service priority might be combined with the goal of optimizing RTP multiplexing, leading to a different choice of terminating Media Gateway.

2. Multiple Terminating Softswitches

Figure 7:
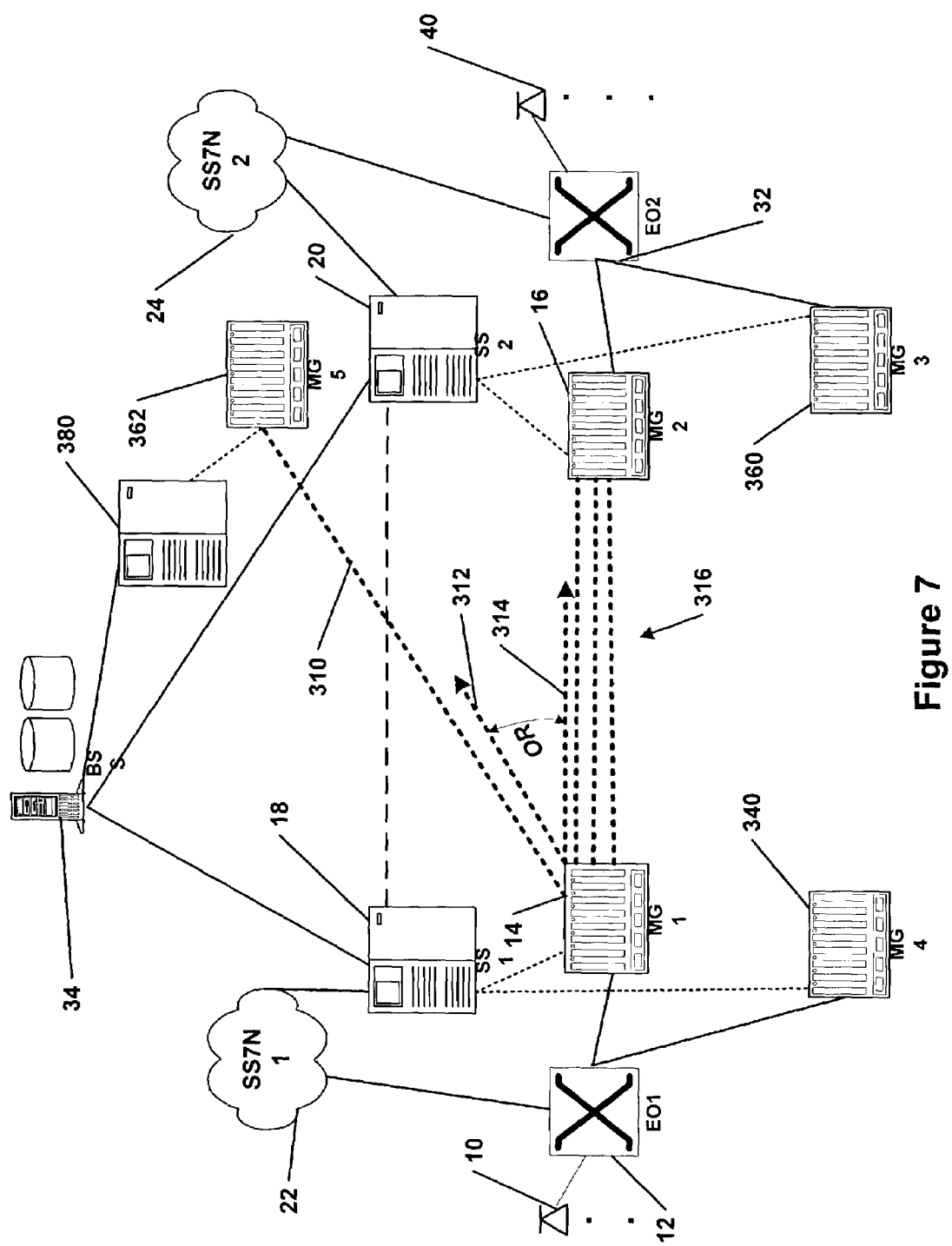
FIG. 7 shows operation of another exemplary embodiment of the present invention using the system in FIG. 1.

In alternative embodiments, the originating softswitch 18 may be faced with having to choose a terminating softswitch 20 from among multiple candidate softswitches before it can begin routing the call. FIG. 7 depicts operation of a system 500 wherein the originating end office switch 12 may request a call to the originating (first) softswitch 18. In this case, the directory server 34 may respond to a request for an identification of the terminating softswitch by providing a list of candidate softswitches (see messages 220a-c in FIG. 5). Before routing the call, the originating softswitch 18 selects the terminating softswitch from between two candidate softswitches: a second softswitch 20 and a third softswitch 380.

In exemplary embodiments, the multiple softswitch response may occur if the terminating PSTN switch is served by more than one softswitch. In FIG. 7, the second softswitch 20 controls the second and third media gateways 16, 360. The third softswitch 380 controls a fifth media gateway 362. The fifth media gateway 362 is also connected to the terminating end office switch 32. Therefore, either the second softswitch 20 or the third softswitch 380 can also complete a call to the terminating end office switch 32.

As in the example in FIG. 6, a call originates from the originating telephone 10 through the originating end office switch 12 with a termination at the terminating end office switch 32. Also as in the example in FIG. 6, the same comments regarding the possible choice by end office switch 32 of an originating media gateway with no pre-existing calls with endpoints that influence call route determination, apply to this case. The list of candidate terminating softswitches returned in response to messages 220a-c in FIG. 5 now contain the second and third softswitches 20, 380.

In one exemplary embodiment, the originating softswitch 18 may have no knowledge of the media gateways under the control of the second and third softswitches 20, 380. Therefore, the originating softswitch 18 would have no basis to choose one or the other from the standpoint of implementing media combination functions. However, the directory server 34 may maintain awareness of all RTP sessions in the system 500. The directory server 34 may order the candidate terminating media gateways according to the number of connections to the originating media gateway 14. By association with the media gateways (e.g. connection information system 100 in FIG. 3), the list of candidate terminating softswitches can be ordered. The originating softswitch 14 may then choose a terminating softswitch according to its position on the list.

In FIG. 7, either second media gateway 16, third media gateway 340, or fifth media gateway 362 can be used as the terminating media gateway to complete the IP path. The directory server 34 may order the second softswitch 20 ahead of the third softswitch 380 because the second media gateway 16, which is under the control of the second softswitch 20, has the most connections to the originating Media Gateway 14. The originating softswitch 18 would then send its SIP "Invite" to the second softswitch 20. The second softswitch 20 would then choose the second media gateway 16 to be the terminating media gateway. In an exemplary embodiment, the analysis to determine the IP path, which has the most existing RTP sessions established to the originating media gateway 14, may be applied twice. Once to the list of candidate terminating softswitches, and once to the candidate terminating media gateways. In alternative embodiments, however, the directory server 34 may apply the analysis once to obtain both the terminating softswitch and the terminating media gateway.

In another exemplary embodiment, the directory server 34 may not be used to order candidate softswitches or media gateways. Each softswitch could have an awareness of which media gateways are under the control of which softswitch. With this information and an unordered list of candidate terminating softswitches, the originating softswitch 14 may create the appropriate ordering on it own. For example, the connection information system 100 (in FIG. 3) may operate within the originating softswitch 14, or in a network device local to it. Such approach may add a burden to each softswitch, but remove a possible bottleneck of RTP session information transfer between softswitches and directory servers.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A method for communicating voice signals on a packet-based network comprising the steps of:

initiating a telephone connection from a calling telephone to an originating media transporter, the originating media transporter being operable to communicate using at least one media combination function;

searching for at least one candidate terminating media transporter having at least one media session in progress with the originating media transporter and being operable to communicate using at least one media combination function;

selecting a terminating media transporter from the candidate terminating media transporters according to the number of media sessions in progress and the media combination function;

establishing a media session between the originating media transporter and the terminating media transporter; and communicating data on the media session using at least one media combination function.

2. The method of claim 1 wherein the originating media transporter is an originating media gateway, the terminating media transporter is a terminating media gateway, the candidate media transporters are candidate terminating media gateways.

3. The method of claim 2 wherein the step of initiating the telephone connection comprises the steps of:
  connecting the originating media gateway to the calling telephone using an originating softswitch; and
  communicating voice signals between the calling telephone and the originating media gateway.

4. The method of claim 3 wherein the step of connecting the originating media gateway to the calling telephone comprises receiving trunk-line identification from the public switched telephone network (PSTN) to identify a media gateway connection and instructing the originating media gateway to process data on the media gateway connection.

5. The method of claim 3 further comprising the step of identifying a terminating softswitch having access to at least one media gateway that is operable to communicate using at least one media combination function.

6. The method of claim 5 further comprising the steps of:
  sending a request for a softswitch identifier to a network device having at least one softswitch identifier identifying a potential terminating softswitch;
  including a dialed number in the request for the softswitch; and
  searching for at least one softswitch operable to connect to the dialed number.

7. The method of claim 6 further comprising the step of sending at least one softswitch identifier to the originating softswitch.

8. The method of claim 3 further comprising the steps of:
  storing at least one softswitch identifier, each identifier identifying a potential terminating softswitch.

9. The method of claim 8 further comprising the step of assigning a priority to each softswitch identifier, the priority being based on a plurality of factors relating to using media combination functions.

10. The method of claim 8 further comprising the step of storing at least one media gateway identifier corresponding to at least one media gateway operable to perform at least one media combination function.

11. The method of claim 2 further comprising the steps of:
  identifying a terminating softswitch; and
  wherein the step of searching for at least one candidate terminating gateway comprises the step of receiving at least one candidate terminating media gateway identifier from the terminating Softswitch.

12. The method of claim 11 wherein the step of selecting from at least one media gateway identifiers corresponding to the terminating Softswitch comprises the steps of:
  determining a number of sessions-in-progress with the originating media gateway for each of at least one media gateways corresponding to the terminating Softswitch; and
  selecting the media gateway having the most number of sessions-in-progress as the terminating media gateway.

13. The method of claim 1 wherein the originating media transporter is an originating Internet Protocol (IP) media relay server, the terminating media transporter is a terminating IP media relay server.

14. A method for communicating voice signals on a packet-based network comprising the steps of:
  initiating a telephone connection from a calling telephone to an originating media transporter, the originating media transporter being operable to communicate using at least one media combination function, wherein the originating media transporter is an originating Internet Protocol (IP) media relay server, wherein the step of initiating the telephone connection comprises the steps of: requesting a data connection between the originating IP media relay server and the calling telephone using an originating softswitch, and communicating voice signals on the data connection between the calling telephone and the originating IP media relay server;
  searching for at least one candidate terminating media transporter having at least one media session in progress with the originating media transporter and being operable to communicate using at least one media combination function, wherein the terminating media transporter is a terminating IP media relay server;
  selecting a terminating media transporter from the candidate terminating media transporters according to the number of media sessions in progress and the media combination function;
  establishing a media session between the originating media transporter and the terminating media transporter; and
  communicating data on the media session using at least one media combination function.

15. The method of claim 14 further comprising the step of identifying a terminating softswitch having access to at least one IP media relay server that is operable to communicate using at least one media combination technique.

16. The method of claim 15 further comprising the steps of:
  sending a request for a softswitch identifier to a network device having at least one softswitch identifier identifying a candidate terminating softswitch;
  including a dialed number in the request for the softswitch; and
  searching for at least one softswitch operable to connect to the dialed number.

17. The method of claim 16 further comprising the step of sending at least one softswitch identifier to the originating softswitch.

18. The method of claim 16 further comprising the steps of:
  storing at least one softswitch identifier, each identifier identifying a candidate terminating softswitch.

19. The method of claim 18 further comprising the step of assigning a priority to each softswitch identifier.

20. The method of claim 18 further comprising the step of storing at least one IP media relay server identifier corresponding to at least one IP media relay server operable to perform at least one media combination function.

21. A method for communicating voice signals on a packet-based network comprising the steps of:
  initiating a telephone connection from a calling telephone to an originating media transporter, the originating media transporter being operable to communicate using at least one media combination function, wherein the originating media transporter is an originating Internet Protocol (IP) media relay server;
  searching for at least one candidate terminating media transporter having at least one media session in progress with the originating media transporter and being operable to communicate using at least one media combination function, wherein the terminating media transporter is a terminating IP media relay server;
  selecting a terminating media transporter from the candidate terminating media transporters according to the number of media sessions in progress and the media combination function by selecting from at least one IP media relay server identifiers corresponding to a terminating softswitch;
  establishing a media session between the originating media transporter and the terminating media transporter; and
  communicating data on the media session using at least one media combination function.

22. The method of claim 21 wherein the step of selecting from at least one IP media relay server identifiers corresponding to the terminating Softswitch comprises the steps of:
- determining a number of sessions-in-progress with the IP media relay server for each of at least one IP media relay servers corresponding to the terminating Softswitch; and
- selecting the IP media relay server having the most number of sessions-in-progress with the IP media relay server as the terminating IP media relay server.

23. A system for communicating voice signals on a packet-based network comprising:
- a first telephone connected to an originating media transporter;
- an originating softswitch connected to the packet-based network, the originating softswitch operable to setup a packet portion of a telephone connection;
- an originating media transporter accessible to the first softswitch, the originating media transporter connected to the first telephone via a digital pathway and to the packet-based network;
- at least one candidate terminating softswitch connected to and operable to access at least one candidate terminating media transporter connected to a second telephone and to the packet-based network;
- the originating softswitch being operable to access connection information relating to the at least one candidate terminating softswitch, wherein the connection information comprises a connection log identifying each media session to which the candidate terminating media transporter is a party and at least one party media transporter with which the candidate terminating media transporter is connected for each media session; and
- a route determination function connected to the originating softswitch, the route determination function operable to identify a terminating softswitch from the at least one candidate terminating softswitch by analyzing the connection information.

24. The system of claim 23 wherein the originating media transporter is an originating media gateway, the terminating media transporter is a terminating media gateway:
- the first telephone connects to the originating media gateway via a public-switched telephone network (PSTN) at a first end office switch;
- the second telephone connects to the at least one candidate terminating media gateways via the PSTN telephone network on a second end office switch; and
- the originating softswitch and the candidate terminating softswitches connect to the first and second end office switches via a PSTN signaling system.

25. The system of claim 24 further comprising a directory server communicatively connected to the originating softswitch and the candidate terminating softswitches, the directory server comprising:
- a plurality of connection records relating to the at least one candidate terminating media gateway; and
- a connection information process operable to retrieve connection information relating to the candidate softswitches based on the plurality of connection records and to provide the connection information in response to a connection information request.

26. The system of claim 23 wherein the connection information comprises a candidate softswitch list comprising at least one softswitch identifier identifying a candidate softswitch.

27. The system of claim 26 wherein the at least one softswitch identifier is ranked in order of best candidate softswitch.

28. The system of claim 23 wherein the connection information comprises a stream-multiplexing indicator for each candidate terminating media transporter to communicate whether the candidate terminating media transporter is capable of using bandwidth optimization.

29. The system of claim 28 wherein the connection information comprises at least one stream-multiplexing technique that each candidate terminating media transporter is able to use.

30. The system of claim 23 wherein the originating media transporter is an originating IP media relay server, the candidate terminating media transporters are candidate terminating IP media relays, and the terminating media transporter is a terminating IP media relay server, and wherein:
- the first telephone connects to the originating IP media relay server via a first IP data connection; and
- the second telephone connects to the at least one candidate terminating media IP media relay server via a second IP data connection.

31. The system of claim 30 further comprising a connection information system communicatively connected to the originating softswitch and the candidate terminating softswitches, the connection information system comprising:
- a plurality of connection records relating to the at least one candidate terminating IP media relay server; and
- a connection information process operable to retrieve connection information relating to the candidate softswitches based on the plurality of connection records and to provide the connection information in response to a connection information request.

* * * * *